United States Patent

[11] 3,618,552

| [72] | Inventor | Andre Grihangne<br>Paris, France |
|---|---|---|
| [21] | Appl. No. | 780,011 |
| [22] | Filed | Nov. 29, 1968 |
| [45] | Patented | Nov. 9, 1971 |
| [73] | Assignee | Societe d'Etudes et de Developpement des<br>Aeroglisseurs Marins Terrestres et<br>Amphibies S.E.D. M.<br>Paris, France |
| [32] | Priority | Dec. 5, 1967 |
| [33] | | France |
| [31] | | 130,975 |

[54] VEHICLE ADAPTED TO BE SUPPORTED BY A CUSHION OF FLUID
6 Claims, 1 Drawing Fig.

[52] U.S. Cl. .................................................... 114/67 A
[51] Int. Cl. .................................................... B63b 1/38
[50] Field of Search .......................................... 114/67.1, 67; 180/121

[56] References Cited
UNITED STATES PATENTS

| 3,078,938 | 2/1963 | Bollum | 114/67 |
| 3,127,863 | 4/1964 | Tinajero | 114/67 |
| 3,291,236 | 12/1966 | Foshag et al. | 114/67 |
| 3,382,678 | 5/1968 | Reh | 114/67 |
| 3,481,296 | 12/1969 | Stephens | 114/67 |

Primary Examiner—Andrew H. Farrell
Attorney—Breitenfeld & Levine

ABSTRACT: A vehicle adapted to be supported by a cushion of fluid, particularly air, and having incorporated therein a plurality of chambers or buoyancy tanks adapted to be filled with a gas under pressure and means for filling the chambers with such gas in order to render the vehicle buoyant.

PATENTED NOV 9 1971
3,618,552
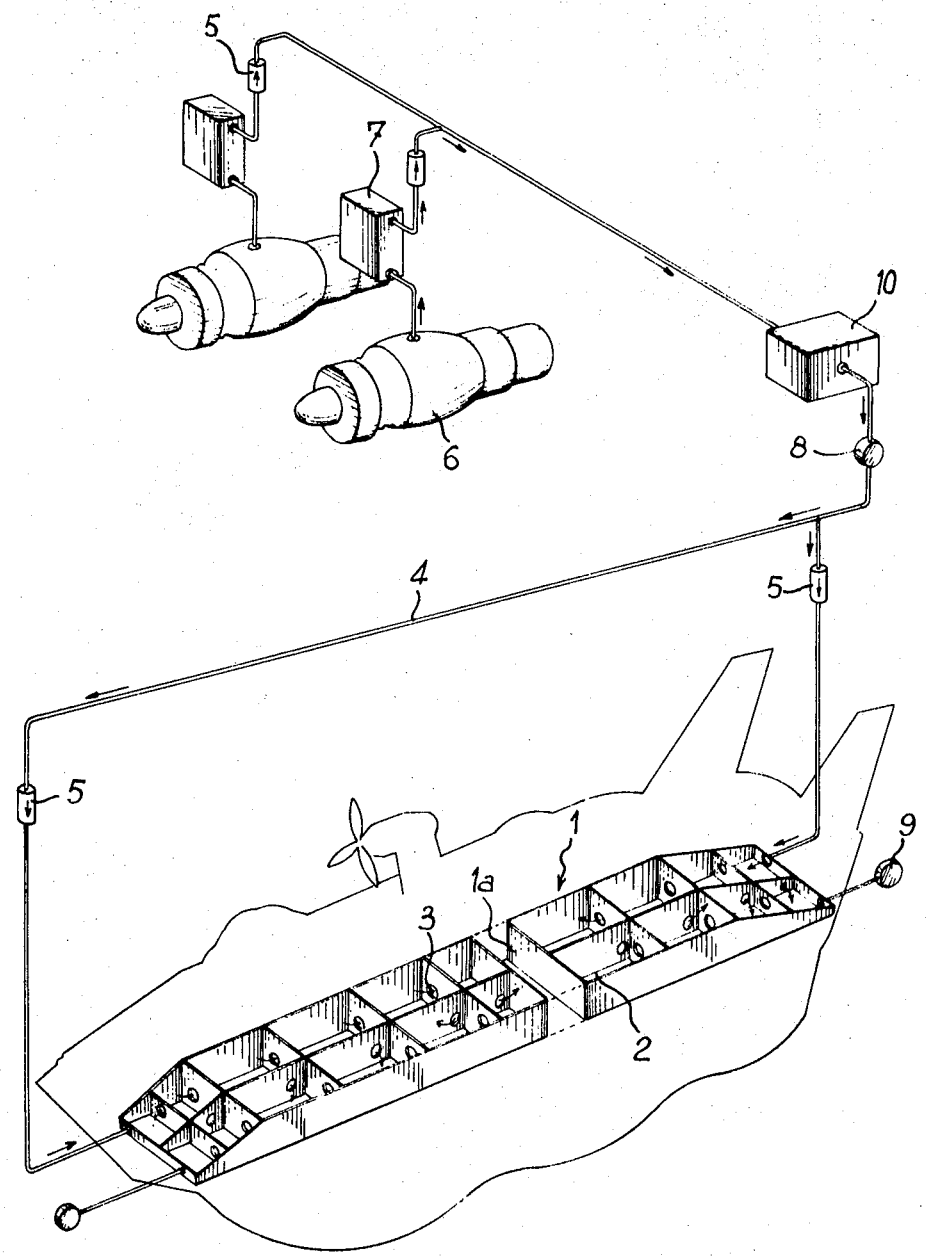
INVENTOR:
ANDRÉ GRIHANGNE
By
Breitenfeld & Levine
ATTORNEYS

VEHICLE ADAPTED TO BE SUPPORTED BY A CUSHION OF FLUID

The present invention relates to machines adapted to be supported above a surface by a cushion of fluid, particularly to vehicles intended to travel on water, on cushions of fluid under pressure, or marine hovercraft.

In order to ensure that vehicles of this type continue to float in the event of an accidental or voluntary interruption of the lifting force, due to a stoppage of feed to the air cushions, various proposals have been made. Generally the structure of the vehicles is equipped with components which ensure that the vehicle floats, for example hollow, watertight members, filled with a gas, expandable or of fixed volume, or chambers filled with a material such as cork, various synthetic plastics foams e.g. expanded polystyrene. However, arrangements of this type have disadvantages in that they do involve an increase in weight and volume.

The present invention, whilst providing additional advantages, makes it possible to obviate or mitigate the aforesaid disadvantages.

According to the present invention, there is provided a vehicle adapted to be supported above a surface by a cushion of fluid comprising in combination, a structure constituted, at least in part, by a plurality of watertight chambers, and means enabling the filling, at least temporarily, of at least a part of the chambers with fluid under pressure.

An embodiment of the invention will now be described, by way of example, with reference to the accompanying drawing which is a perspective view of a marine hovercraft, showing the location of the pressurized chambers, with a diagrammatic view of the equipment, which for the sake of clarity, has been separated from the vehicle.

Referring to the drawing, the reference numeral 1 indicates generally the structure of a hovercraft-type machine. This structure, which may have a different shape to that which is shown, includes a series of buoyancy compartments or chambers 2, which are airtight in relation to the outside.

The various chambers 2 are in communication with each other by means of apertures 3 of small section located at their upper part, except in a central section 1a which is reserved for the passage of driving gear (not shown). These chambers 2 are supplied with a fluid under pressure, preferably compressed air, from a common pneumatic circuit 4, through the intermediary of one-way valves 5, the supply passing into the assembly of chambers 2 from the two end chambers.

The generation of compressed air in the circuit 4 is ensured by a bleed taken in parallel from compressors of two turbomotors 6 which serve the vehicle, after passing through heat exchangers 7, and subsequently a pressure control device 8. This device 8 can be such that it maintains a constant predetermined pressure inside the chambers 2, or alternatively controls the pressure according to the circumstances under which the vehicle is used or according to various external parameters. Pressure gauges 9 enable the pressure inside the chambers to be controlled.

There is included in the pneumatic circuit a device 10 for drying the pressurized air.

An advantage of this solution provided by the present invention is to use the existing structure without increasing the weight or volume. In addition the existing structure is subjected to a minimum of stress, since the chamber partitions are in a position of equilibrium between, on the one hand, the external hydrostatic pressure and, on the other hand, the pressure established in the chambers. The risk of compression of the structure is thus reduced and the reliability of the machine consequently increased.

It will be understood that the supply to the chambers of gas under pressure may be maintained permanently or only when the support of the machine reacting with its supporting surface has been suppressed either accidentally or intentionally. It may also be subjected to a constant pressure which is predetermined or varies with the conditions under which it is used.

Although the chambers are preferably supplied from the same source of compressed air, which may be either the compressor of one or more turbomotors which serves the vehicle as in the above-described embodiment, or an auxiliary compressor provided for this purpose, the chambers may be supplied separately. The arrangement as described in the foregoing embodiment, however, simplifies the pneumatic circuit and at the same time guarantees watertightness of the assembly when floating and when one chamber is punctured.

It can be seen that the presence of air having a pressure greater than the hydrostatic pressure surrounding the chambers 2 prevents the penetration of water into the chambers, if their watertight seal becomes defective. Moreover, the air dried by 10 makes it possible to avoid corrosion of the materials constituting the structure.

Finally, the application of compressed air to the existing structure, in the manner described above, ensures that with this same structure, the vehicle will float in the event of an accidental or intentional interruption of the lifting force provided by the air cushions, and at the same time the resistance of this structure will be increased and it will be protected against the risks of corrosion.

What is claimed is:

1. A vehicle adapted to be supported above a surface by a cushion of air, comprising a structure having a plurality of watertight buoyancy chambers each having a closed bottom, said chambers being devoid of means for permitting water to enter them so that said chambers remain dry at all times, and said chambers being filled with only a gas, partitions separating said chambers, at least two of said chambers being in direct communication with each other through an aperture in the partition between them, and means outside said chambers for at least temporarily filling at least some of said chambers with gas under a pressure greater than the hydrostatic pressure surrounding the vehicle.

2. A vehicle according to claim 1, in which the chambers are supplied with gas under pressure from the same source.

3. A vehicle as claimed in claim 1, in which the gas is air.

4. A vehicle as claimed in claim 1, comprising at least one turbomotor for its propulsion, and wherein said filling means includes means for bleeding air from the compressor of each turbomotor to provide the gas under pressure.

5. A vehicle according to claim 1, in which there is provided a dessicating device for drying the air prior to its passage into the chambers.

6. A vehicle according to claim 1, comprising means for enabling variation of the pressure of gas supplied to the chambers.

* * * * *